United States Patent
Pakusch et al.

(10) Patent No.: US 6,552,116 B1
(45) Date of Patent: Apr. 22, 2003

(54) MULTISTAGE EMULSION POLYMER

(75) Inventors: Joachim Pakusch, Speyer (DE); Uwe Dittrich, Ludwigshafen (DE); Harald Röckel, Neustadt (DE); Alan Smith, Charlotte, NC (US); Erich Gulbins, Heidelberg (DE); Li Zhuo, Fort Mill, SC (US)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/703,875

(22) Filed: Nov. 2, 2000

(30) Foreign Application Priority Data

Nov. 2, 1999 (DE) .......................................... 199 52 671

(51) Int. Cl.$^7$ .................................................. C08F 2/22
(52) U.S. Cl. ...................... 524/460; 523/201; 524/458; 524/521; 524/522; 526/201
(58) Field of Search ................................ 524/458, 460, 524/521, 522; 523/201; 526/201

(56) References Cited

U.S. PATENT DOCUMENTS

| 3,244,655 A | 4/1966 | Sullivan et al. |
| 3,454,516 A | 7/1969 | Victorius |
| 5,021,469 A | 6/1991 | Langerbeins et al. |
| 5,116,901 A * | 5/1992 | Biale ........................... 524/457 |
| 5,118,749 A * | 6/1992 | Knutson ...................... 524/460 |
| 5,455,298 A * | 10/1995 | Farwaha et al. ............. 524/612 |
| 5,744,540 A | 4/1998 | Baumstark et al. |
| 6,031,038 A * | 2/2000 | Baumstark et al. ......... 524/460 |

FOREIGN PATENT DOCUMENTS

EP 0 609 756 8/1994

* cited by examiner

Primary Examiner—Judy M. Reddick
(74) Attorney, Agent, or Firm—Oblon, Spivak, McClelland, Maier & Neustadt, P.C.

(57) ABSTRACT

A multi-stage emulsion polymer containing at least one first domain having a glass transition temperature Tg of from −10 to +40° C. and at least one second domain having a Tg of from +50 to 120° C., the weight ratio of the first domain to the second domain being within the range from 90:10 to 50:50. The first and/or the second domain containing from 0.1 to 10% by weight of a nitrogen-coutaining adhesion monomer and the first domain containing at least 10% by weight of vinyl aromatic compounds and/or the second domain containing at least 15% by weight of vinyl aromatic compounds and/or $C_4$ to $C_{12}$ alkylmethacrylates.

33 Claims, No Drawings

MULTISTAGE EMULSION POLYMER

BACKGROUND OF THE INVENTION

Field of the Invention

The invention relates to a multistage emulsion polymer particularly suitable as a binder for aqueous high gloss paints and to a coating composition comprising it.

DISCUSSION OF THE BACKGROUND

DE 44 39 459 discloses an aqueous polymer dispersion prepared by two-stage emulsion polymerization. The difference between the glass transition temperatures $T_g^1$ and $T_g^2$ of the individual stages be polymerized, from 0.1 to 10% by weight of a nitrogen-containing adhesion monomer are copolymerized, of which from 20 to 100 mol% are copolymerized in the first polymerization stage. It has been found that the polymer dispersions of DE 44 39 459 result in coating compositions whose gloss is insufficient for certain applications.

DE 12 20 613 discloses a process for preparing polymer emulsions by polymerizing at least one film-forming monomer, at least one non-film-forming monomer, and an unsaturated carboxylic acid. The polymerization takes place in two stages, at least 70% by weight of the overall amount of the film-forming monomer and up to 70% by weight of the overall amount of the non-film-forming monomer being copolymerized in the first stage and the remainder of the monomers being copolymerized in the second polymerization stage. Styrene is used as the preferred non-film-forming monomer. The polymer emulsion of DE 12 20 613, although it gives coating compositions of high gloss, has the disadvantage of inadequate blocking resistance and inadequate abrasion resistance.

U.S. Pat. No. 3,454,516 describes acrylate dispersions consisting of a soft phase and a hard phase, the soft phase consisting of ethyl acrylate, butyl methacrylate and methacrylic acid and the hard phase of methyl methacrylate, butyl methacrylate and methacrylic acid. The proportion of the soft phase is from 40 to 70% by weight.

EP 609 756 describes a coating composition comprising a multistage polymer having at least two polymer domains one polymer domain having a glass transition temperature in the range from −5 to −55° C. and constituting from 90 to 10% by weight of the overall monomer and the other polymer domain having a glass transition temperature in the range from 0 to +50° C. and constituting from 10 to 90% by weight of the overall polymer. The gloss properties of the coating composition are not addressed.

EP 0 379 892 discloses binders for aqueous gloss paints, these binders being composed of a core material having a glass transition temperature of more than 40° C. and a shell material having a glass transition temperature of less than 70° C. but at least 20 K below that of the core material, the particles having a diameter of less than 200 nm, and the composition of the shell material including a polymer with at least 4% by weight of an ethylenically unsaturated carboxylic acid and more than 80% by weight of one or more monomers from the group consisting of styrene and (meth) acrylic alkyl esters having at least 4 carbon atoms in the alkyl radical. The hard core material accounts for from 5 to 45% by weight of the emulsion polymer.

The known multistage emulsion polymers and, respectively, the coating compositions comprising them do not have a satisfactory, balanced profile of properties in respect of gloss, blocking resistance and abrasion resistance.

SUMMARY OF THE INVENTION

It is an object of the present invention to provide emulsion polymers which lead to coating compositions having high gloss, high blocking resistance at low minimum film-forming temperature, and high abrasion resistance. Furthermore, the emulsion polymers are required to lend themselves well to thickening with associative thickeners.

DESCRIPTION OF THE PREFERRED EMBODIMENTS

We have found that this object is achieved by a multistage emulsion polymer comprising at least one first domain having a glass transition temperature $T_g$ of from −10 to +40° C. and at least one second domain having a $T_g$ of from +50 to 120° C., the weight ratio of the first domain to the second domain being in the range from 90:10 to 50:50 and the first domain containing copolymerized units of 1a) from 5 to 60% by weight of methyl methacrylate and/or ethyl methacrylate, 1b) from 20 to 80% by weight of $C_4$–$C_{12}$ alkyl acrylate, 1c) up to 50% by weight of vinylaromatic compounds, 1d) from 0.1 to 5% by weight of ethylenically unsaturated carboxylic acids, 1e) up to 5% by weight of ethylenically unsaturated carboxamides, 1f) up to 10% by weight of other ethylenically unsaturated monomers, and the second domain containing copolymerized units of 2a) up to 99.9% by weight of methyl methacrylate and/or ethyl methacrylate, 2b) up to 99.9% by weight of vinylaromatic-compounds and/or $C_4$–$C_{12}$ alkyl methacrylates, 2c) from 0.1 to 5% by weight of ethylenically unsaturated carboxylic acids, 2d) up to 10% by weight of ethylenically unsaturated carboxamides, 2e) up to 10% by weight of other ethylenically unsaturated monomers, with the proviso that the first and/or the second domain contains from 0.1 to 10% by weight, preferably from 1 to 5% by weight, of a nitrogen-containing adhesion monomer and, further, that the first domain contains at least 10% by weight of vinylaromatic compounds and/or the second domain contains at least 15% by weight of vinylaromatic compounds and/or $C_4$–$C_{12}$ alkyl methacrylates, all of the weights specified being based on the respective domain.

The weight ratio of the first domain to the second domain is preferably in the range from 80:20 to 60:40.

Preferred emulsion polymers of the invention contain in the first domain:

| | |
|---|---|
| from 5 to 30% by weight of | methyl methacrylate and/or ethyl methacrylate, |
| from 30 to 60% by weight of | $C_4$–$C_{12}$ alkyl acrylate, |
| from 15 to 50% by weight of | vinylaromatic compounds, |
| from 0.1 to 5% by weight of | ethylenically unsaturated carboxylic acid, |
| up to 5% by weight of | ethylenically unsaturated carboxamide, |
| up to 10% by weight of | other ethylenically unsaturated monomers, |

-continued and in the second domain:

| | |
|---|---|
| from 45 to 99.9% by weight of | methyl methacrylate and/or ethyl methacrylate, if desired |
| from 1.0 to 50% by weight of | vinylaromatic compounds and/or $C_4$ to $C_{12}$ alkyl methacrylate, |
| from 0.1 to 5% by weight of | ethylenically unsaturated carboxylic acid, |
| up to 10% by weight of | ethylenically unsaturated carboxamide, |
| up to 10% by weight of | other ethylenically unsaturated monomers. |

Other preferred emulsion polymers of the invention contain in the first domain:

| | |
|---|---|
| from 5 to 50% by weight of | methyl methacrylate and/or ethyl methacrylate, |
| from 30 to 60% by weight of | $C_4$–$C_{12}$ alkyl acrylate, |
| from 0.1 to 5% by weight of | ethylenically unsaturated carboxylic acid, |
| up to 5% by weight of | ethylenically unsaturated carboxamide, |
| up to 10% by weight of | other ethylenically unsaturated monomers, | and in the second domain:

| | |
|---|---|
| up to 84.9% by weight of | methyl methacrylate and/or ethyl methacrylate, |
| from 15 to 99.9% by weight of | vinylaromatic compounds and/or $C_4$–$C_{12}$ alkyl methacrylates, |
| from 0.1 to 5% by weight of | ethylenically unsaturated carboxylic acid, |
| up to 10% by weight of | ethylenically unsaturated carboxamide, |
| up to 10% by weight of | other ethylenically unsaturated monomers. |

For obtaining the desired glass transition temperatures $T_g$ by selecting appropriate types and amounts of monomers it is useful to use the formula of Fox (T. G. Fox, Bull. Amer. Phys. Soc. (Ser. II) 1 (1956) 123), according to which the glass transition temperature $T_g$ of copolymers is given in good approximation by:

$$\frac{1}{T_g} = \frac{X^1}{T_g^1} + \frac{X^2}{T_g^2} + \ldots + \frac{X^S}{T_g^S}$$

where $X^1, X^2 \ldots X^S$ are the mass fractions of the monomers and $T_g^1, T_g^2 \ldots T_g^S$ are the glass transition temperatures of the homopolymers composed in each case of only one of the monomers 1,2, . . . S, in degrees Kelvin.

The glass transition temperatures of the homopolymers of the customary monomers are known and are listed, for example, in J. Brandrup and E. H. Immergut, Polymer Handbook, 2nd edition, J. Wiley Verlag, New York 1995.

The $C_4$–$C_{12}$ alkyl acrylates are selected preferably from n-butyl acrylate, 2-ethylhexyl acrylate and mixtures thereof.

The $C_4$–$C_{12}$ alkyl methacrylates are selected preferably from n-butyl methacrylate, isobutyl methacrylate, t-butyl methacrylate and mixtures thereof.

The vinylaromatic compounds are selected preferably from styrene, α-methylstyrene, 3- and 4-vinyltoluene and mixtures thereof. Styrene is particularly preferred.

The ethylenically unsaturated carboxylic acid is selected preferably from $C_3$–$C_6$ α,β-monoethylenically unsaturated mono- and dicarboxylic acids, such as acrylic acid, methacrylic acid, maleic acid, fumaric acid, itaconic acid and mixtures thereof.

Preferred unsaturated carboxamides are acrylamide, methacrylamide, 2-acrylamido-2-methylpropanesulfonic acid, N-methylolacrylamide, N-methylolmethacrylamide and mixtures thereof.

The emulsion polymer of the invention may contain in the first and/or second polymer domain up to 10% by weight of other ethylenically unsaturated monomers. Examples of these include polyethylenically unsaturated monomers, which within the disperse polymer particles bring about crosslinking of the polymer chains. These include alkylene glycol diacrylates and dimethacrylates, such as ethylene glycol diacrylate, 1,3-butylene glycol diacrylate, 1,4-butylene glycol diacrylate, and propylene glycol diacrylate. Also suitable are divinylbenzene, vinyl methacrylate, vinyl acrylate, allyl methacrylate, allyl acrylate, diallyl maleate, diallyl fumarate, methylenebisacrylamide, cyclopentadienyl acrylate, and triallyl cyanurate.

The other monomers further include ethylenically unsaturated nitriles, such as acrylonitrile and methacrylonitrile.

Particularly suitable nitrogen-containing adhesion monomers are free-radically polymerizable monomers having at least one amino, ureido or N-heterocyclic group. Examples that may be mentioned include aminoethyl acrylate and methacrylate, dimethylaminoethyl acrylate and methacrylate, diethylaminoethyl acrylate and methacrylate, dimethylaminopropyl acrylate and methacrylate, 3-dimethylamino-2,2-dimethylpropyl 1-acrylate and 1-methacrylate, 2-N-morpholinoethyl acrylate and methacrylate, 2-N-piperidinoethyl acrylate and methacrylate, N-(3-dimethylaminopropyl)-acrylamide and -methacrylamide, N-dimethylaminoethylacrylamide and -methacrylamide, N-diethylaminoethylacrylamide and -methacrylamide, N-(4-morpholinomethyl)acrylamide and -methacrylamide, vinylimidazole; and also monoethylenically unsaturated derivatives of ethyleneurea, such as N-(2-acryloyloxyethyl) ethyleneurea, N-(β-acrylamidoethyl) ethyleneurea, N-2-(allylcarbamato) aminoethylimidazolidinone (WAM IV from Air Products & Chemicals), N-(3-allyloxy-2-hydroxypropyl-aminoethylethyleneurea (Sipomer® WAM from Alcolac), N-vinylethyleneurea, N-vinyloxyethylethyleneurea, N-methacryloxyacetoxyethylethyleneurea, N-(acrylamidomethylene)-ethyleneurea, N-(methacrylamidomethylene)ethyleneurea, and N-(2-methacryloyloxyethyl)ethyleneurea, which is also known as ureidoethyl methacrylate. The latter is particularly preferred. Preferably from 50 to 100 mol% of the overall amount of the adhesion monomer are copolymerized in the first domain.

The emulsion polymer of the invention is of multistage construction; that is, it has two or more polymer domains. It is obtainable by emulsion-polymerizing a monomer mixture constituting a higher polymer domain in the presence of the polymer from the preceding stage. For instance, a two-stage emulsion polymer is prepared by emulsion-polymerizing a monomer mixture constituting the second polymer domain in the presence of a polymer consisting of the first polymer domain.

Preferably, the multistage emulsion polymer of the invention is prepared with a solids content of from 40 to 70% by weight, in particular a solids content of more than 50% by weight.

With a view to the desired performance properties it is advantageous for the weight-average diameter of the polymer particles to be in the range from 50 to 250 nm. Particularly advantageous weight-average polymer particle diameters are from 100 to 200 nm. The particle diameter is suitably determined using an analytical ultracentrifuge in accordance with the method of W. Scholtan and H. Lange, Kolloid-Z. und Z.-Polymere 250 (1972) 782–796.

The multistage emulsion polymer of the invention is prepared by the process of free-radical aqueous emulsion polymerization in the presence of dispersants and free-radical polymerization initiators.

The ratio of the water phase to the overall amount of the monomers used in both stages is chosen in accordance with the desired solids content of the emulsion polymer to be prepared.

The monomer composition constituting the first domain can be included as an initial charge to the polymerization vessel, as a monomer mixture in the form of an aqueous monomer emulsion, or can be metered in in the course of the first polymerization stage in bulk or in a form in which it is emulsified in an aqueous medium. After the first polymerization stage, the monomer composition constituting the second polymer domain can be added, correspondingly, all at once to the polymerization vessel or can be metered in whole or in part in the course of the second polymerization stage, in bulk or in a form in which it is emulsified in an aqueous medium. The nitrogen-containing adhesion monomers to be copolymerized in accordance with the invention are preferably added to the polymerization vessel as a mixture with the other monomers.

In both stages, the polymerization is triggered by means of customary free-radical initiators. The amount of these compounds required is preferably from 0.05 to 10% by weight, with particular preference from 0.2 to 5% by weight, based on the monomers used in the polymerization.

Examples of suitable polymerization initiaotrs are peroxides, hydroperoxides, peroxodisulfates, percarbonates, peroxo esters, hydrogen peroxide, and azo compounds. Examples of initiators, which may be soluble or else insoluble in water, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfates, azodiiso-butyronitrile, 2,21-azobis(2-amidinopropane) dihydrochloride, 2-(carbamoylazo) isobutyronitrile, and 4,4-azobis(4-cyanovaleric acid). The known redox initiator systems as well, such as $H_2O_2$/ascorbic acid or t-butyl hydroperoxide/sodium hydroxymethanesulfinate, for example, can be used as polymerization initiators.

The initiators can be employed alone or in a mixture with one another, examples being mixtures of hydrogen peroxide and sodium peroxodisulfate. For polymerization in an aqueous medium it is preferred to use water-soluble initiators.

To prepare polymers of low average molecular weight it is often judicious to conduct the copolymerization in the presence of regulators. Customary regulators can be used for this purpose, examples being organic compounds containing SH groups, such as 2-mercaptoethanol, 2-mercaptopropanol, mercaptoacetic acid, tert-butyl mercaptan, n-octyl mercaptan, n-dodecyl mercaptan and tert-dodecyl mercaptan, hydroxylammonium salts such as hydroxylammonium sulfate, formic acid, sodium bisulfite, or isopropanol. The polymerization regulators are generally used in amounts of from 0.05 to 5% by weight, based on the monomers.

Suitable dispersants are the emulsifiers and protective colloids which are commonly used to conduct free-radical aqueous emulsion polymerizations.

Examples of suitable protective colloids are polyvinyl alcohols, cellulose derivatives, or vinylpyrrolidone copolymers. An exhaustive description of further suitable protective colloids is given in Houben-Weyl, Methoden der organischen Chemie, volume XIV/1, makromolekulare Stoffe [macromolecular substances], Georg-Thieme-Verlag, Stuttgart, 1961, pp. 411–420.

Suitable emulsifiers include anionic, nonionic, cationic, and amphoteric emulsifiers. Customary emulsifiers are, for example, ethoxydimono-, -di- and -trialkylphenols (EO units: 3 to 100, alkyl: $C_4$–$C_{12}$), ethoxylated fatty alcohols (EO units: 3 to 100, preferably 6 to 50, alkyl: $C_6$–$C_{20}$) and also alkali metal salts and ammonium salts of alkyl sulfates (alkyl: $C_8$–$C_{18}$), of sulfuric monoesters with ethoxylated alkanols (EO units: 1 to 70, especially 2 to 10; alkyl: $C_{10}$–$C_{18}$) and with ethoxylated alkylphenols (EO units: 3 to 100, preferably 6 to 50; alkyl: $C_4$–$C_{18}$), of alkylsulfonic acids (alkyl: $C_{10}$–$C_{18}$) and of alkylarylsulfonic acids (alkyl: $C_9$–$C_{18}$). Further suitable emulsifiers, such as sulfosuccinic esters, can be found in Houben-Weyl, Methoden der organischen Chemie, volume XIV/1, makromolekulare Stoffe [macromolecular substances], Georg-Thieme-Verlag, Stuttgart, 1961, pp. 192–208.

Further compounds found suitable as anionic surface-active substances are compounds of the formula I

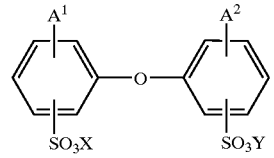

where $A^1$ and $A^2$ are hydrogen or $C_4$–$C_{24}$ alkyl but are not simultaneously hydrogen, and X and Y can be alkali metal ions and/or ammonium ions. In the formula I, $A^1$ and $A^2$ are preferably linear or branched alkyl radicals of 6 to 18 carbon atoms or hydrogen, and in particular have 6, 12 and 16 carbon atoms, X and Y are preferably sodium, potassium or ammonium ions, sodium being particularly preferred. Compounds of this kind are obtainable under the name Dowfax® 2A1 (tradename of Dow Chemical Co.).

a Preference is given to the use of a combination of one anionic and one nonionic emulsifier, in particular in a weight.ratio of from 1:5 to 5:1.

In order to establish defined particle diameters it is advisable to prepare the emulsion polymer in the presence of a seed latex, especially a polystyrene seed latex. This latex can be introduced as an initial charge to the polymerization vessel or can be formed in the vessel beforehand in situ. The amount of dispersant added in the subsequent course of the free-radical aqueous emulsion polymerization is generally calculated such that the critical micelle formation concentration is not subsequently exceeded, thus preventing the formation of new polymer particles.

The invention further provides a water-based coating composition comprising an emulsion polymer of the invention.

The invention additionally provides a water-based coating composition comprising an emulsion polymer as defined above and at least one pigment. Examples of suitable pigments are titanium dioxide, preferably in rutile form, as offered under the designations Tioxide R-HD2, Tioxide TR 92 and Tioxide R-TC 90 from Tioxide Europe GmbH, Ratingen, Germany; Kronos 2190 and Kronos 2063 S from Kronos-Titan GmbH, Leverkusen, Germany; and Tiona RCS 535 from Millennium Inorganic Chemistry, Baltimore.

The pigment volume concentration of the coating composition is preferably from 10 to 30. The pigment volume concentration is 100 times the ratio of the overall volume of pigment and other fillers divided by the overall volume of pigment, fillers and binder polymer.

The coating composition of the invention may advantageously comprise an associative thickener. Examples of such are hydrophobically modified, alkali-swellable emulsion polymers (HASE), hydrophobically modified, ethoxylated urethanes (HEUR), hydrophobically modified cellulose derivates, or styrene-MAA terpolymers (SMAT). Suitable types are Collacral PU 85 and Collacral PU 75 (BASF AG), Rheolate 208 (Rheox GmbH, Leverkusen, Germany), Acrysol RM 2020 (Rohm and Haas), Coatex BR 100 P (DIMED GmbH, Wesseling, Germany), and Tafigel PUR 50 (Munzing-Chemie).

The coating composition of the invention is particularly suitable as a gloss or high gloss paint for substrates such as wood, metal, plastics, and mineral materials.

The invention is illustrated further by the examples below.

The coating compositions prepared were evaluated using the following test methods:

The wet abrasion (scrub) resistance was tested in accordance with ASTM D2486 as follows: using an applicator, the coating composition is applied in a defined film thickness to a Leneta sheet. The test specimen is dried under standard climatic conditions for 14 days. It is then inserted in a Gardco scrub machine and the brush head is lowered onto the coated surface. About 10 g of standardized scrub medium (type SC-2) is distributed between the bristles of the brush head. The scrub tester is switched on and a note is made of the number of cycles after which a defined proportion of the coating film is removed.

The gloss of the coating compositions was tested in accordance with ASTM D523 as follows: the coating composition is applied to the test sheet in a defined film thickness and left to dry at room temperature for 72 hours. The test specimen is inserted into a calibrated reflectometer and, under defined angles of illumination and observation, a note is made of the extent to which the incident light has been reflected or scattered.

The viscosity of the coating compositions was measured in accordance with NIST viscosity standard using a Brookfield KU-1.

Abbreviations:

| | |
|---|---|
| DI water | deionized water |
| PS | polystyrene |
| AM | acrylamide |
| AA | acrylic acid |
| UMA | ureidoethylmethacrylamide |
| S | styrene |
| MMA | methyl methacrylate |
| BA | butyl acrylate |
| NaPS | sodium peroxodisulfate |
| t-BHP | t-butyl hydroperoxide |
| MAA | methacrylic acid |

Dispersion D1

The respective feed streams were prepared from the materials listed in the table below. Subsequently, the stated initial-charge amount of DI water was heated with stirring in a five-necked glass flask equipped with stirrer, reflux condenser and three dropping funnels. At 850° C., the portion of feed stream 3, and the seed, were added and the mixture was subsequently stirred at this temperature for 5 minutes. Thereafter, feed stream 1 was run in over 120 minutes and feed stream 3 over 165 minutes. Immediately after the end of feed stream 1, feed stream 2 was started and was metered in over 45 minutes. After 60 minutes of polymerization to completion, the mixture was cooled to 70° C. Then feed streams 4 and 5 were added and feed stream 6 was metered in over 3 minutes. After cooling to room temperature, the pH was adjusted using feed stream 7, and the mixture was filtered. The resulting dispersion had the physical properties summarized in Table 1.

| | | | Conc. [%] | Mono. [%] |
|---|---|---|---|---|
| Initial charge: | 210.00 g | DI water | | |
| | 37.88 g | PS seed | 33.0 | 2.50 |
| | 3.00 g | Feed stream 3 | | 10.00 |
| Feed stream 1: | 84.00 g | DI water | | |
| | 33.33 g | Na pyrophosphate | 3.0 | 0.20 |
| | 50.00 g | Na lauryl sulfate | 15.0 | 1.50 |
| | 25.00 g | Lutensol AT 18 | 20.0 | 1.00 |
| | 4.00 g | AM | 50.0 | 0.40 |
| | 3.75 g | AA | 100.0 | 0.75 |
| | 40.00 g | UMA (25% in MMA) | | 8.00 |
| | 70.00 g | S | 100.0 | 14.00 |
| | 70.00 g | MMA | 100.0 | 14.00 |
| | 190.00 g | BA | 100.0 | 38.00 |
| Feed stream 2: | 39.00 g | DI water | | |
| | 6.67 g | Na lauryl sulfate | 15.0 | 0.20 |
| | 12.50 g | Lutensol AT 18 | 20.0 | 0.50 |
| | 3.75 g | AA | 100.0 | 0.75 |
| | 120.50 g | MMA | 100.0 | 24.10 |
| Feed stream 3: | 0.75 g | NaPS | 100.0 | 0.15 |
| | 29.25 g | DI water | | |
| Feed stream 4: | 2.00 g | NH$_3$ | 25.0 | 0.10 |
| Feed stream 5: | 0.71 g | t-BHP | 70.0 | 0.10 |
| | 4.29 g | DI water | | |
| Feed stream 6: | 0.45 g | Na$_2$S$_2$O$_5$ | 100.0 | 0.09 |
| | 0.30 g | Acetone | 100.0 | 0.06 |
| | 24.25 g | DI water | | |
| Feed stream 7: | 2.00 g | NH$_3$ | 25.0 | 0.10 |

Dispersion D2

The procedure followed was as for Dispersion D1. The resulting dispersion had the physical properties summarized in Table 1.

| | | | Conc. [%] | Mono. [%] |
|---|---|---|---|---|
| Initial charge: | 210.00 g | DI water | | |
| | 37.88 g | PS seed | 33.0 | 2.50 |
| | 3.00 g | Feed stream 3 | | 10.00 |
| Feed stream 1: | 85.00 g | DI water | | |
| | 33.33 g | Na pyrophosphate | 3.0 | 0.20 |
| | 50.00 g | Na lauryl sulfate | 15.0 | 1.50 |
| | 25.00 g | Lutensol AT 18 | 20.0 | 1.00 |
| | 4.00 g | AM | 50.0 | 0.40 |
| | 3.75 g | AA | 100.0 | 0.75 |
| | 40.00 g | UMA (25% in MMA) | 100.0 | 8.00 |
| | 70.00 g | S | 100.0 | 14.00 |
| | 70.00 g | MMA | 100.0 | 14.00 |
| | 190.00 g | BA | 100.0 | 38.00 |
| Feed stream 2: | 38.00 g | DI water | | |
| | 6.67 g | Na lauryl sulfate | 15.0 | 0.20 |
| | 12.50 g | Lutensol AT 18 | 20.0 | 0.50 |
| | 3.75 g | AA | 100.0 | 0.75 |
| | 60.00 g | S | 100.0 | 12.00 |
| | 60.50 g | MMA | 100.0 | 12.10 |
| Feed stream 3: | 0.75 g | NaPS | 100.0 | 0.15 |
| | 29.25 g | DI water | | |

-continued

|  |  |  | Conc. [%] | Mono. [%] |
|---|---|---|---|---|
| Feed stream 4: | 2.20 g | NH$_3$ | 25.0 | 0.11 |
| Feed stream 5: | 0.71 g | t-BHP | 70.0 | 0.10 |
|  | 4.29 g | DI water |  |  |
| Feed stream 6: | 0.45 g | Na$_2$S$_2$O$_5$ | 100.0 | 0.09 |
|  | 0.30 g | Acetone | 100.0 | 0.06 |
|  | 24.25 g | DI water |  |  |
| Feed stream 7: | 2.20 g | NH$_3$ | 25.0 | 0.11 |

Dispersion D3

The procedure followed was as for Dispersion D1. The resulting impression had the physical properties summarized in Table 1.

|  |  |  | Conc. [%] | Mono. [%] |
|---|---|---|---|---|
| Initial charge: | 210.00 g | DI water |  |  |
|  | 37.88 g | PS seed | 33.0 | 2.50 |
|  | 3.00 g | Feed stream 3 |  | 10.00 |
| Feed stream 1: | 85.00 g | DI water |  |  |
|  | 33.33 g | Na pyrophosphate | 3.0 | 0.20 |
|  | 50.00 g | Na lauryl sulfate | 15.0 | 1.50 |
|  | 25.00 g | Lutensol AT 18 | 20.0 | 1.00 |
|  | 4.00 g | AM | 50.0 | 0.40 |
|  | 3.75 g | AA | 100.0 | 0.75 |
|  | 40.00 g | UMA (25% in MMA) | 100.0 | 8.00 |
|  | 70.00 g | S | 100.0 | 14.00 |
|  | 70.00 g | MMA | 100.0 | 14.00 |
|  | 190.00 g | BA | 100.0 | 38.00 |
| Feed stream 2: | 38.00 g | DI water |  |  |
|  | 6.67 g | Na lauryl sulfate | 15.0 | 0.20 |
|  | 12.50 g | Lutensol AT 18 | 20.0 | 0.50 |
|  | 3.75 g | AA | 100.0 | 0.75 |
|  | 120.50 g | S | 100.0 | 24.10 |
| Feed stream 3: | 0.75 g | NaPS | 100.0 | 0.15 |
|  | 29.25 g | DI water |  |  |
| Feed stream 4: | 2.20 g | NH$_3$ | 25.0 | 0.11 |
| Feed stream 5: | 0.71 g | t-BHP | 70.0 | 0.10 |
|  | 4.29 g | DI water |  |  |
| Feed stream 6: | 0.45 g | Na$_2$S$_2$O$_5$ | 100.0 | 0.09 |
|  | 0.30 g | Acetone | 100.0 | 0.06 |
|  | 24.25 g | DI water |  |  |
| Feed stream 7: | 2.20 g | NH$_3$ | 25.0 | 0.11 |

Dispersion D4

The procedure followed was as for Dispersion D1. The resulting dispersion had the physical properties summarized in Table 1.

|  |  |  | Conc. [%] | Mono. [%] |
|---|---|---|---|---|
| Initial charge: | 210.00 g | DI water |  |  |
|  | 37.88 g | PS seed | 33.0 | 2.50 |
|  | 3.00 g | Feed stream 3 |  | 10.00 |
| Feed stream 1: | 84.00 g | DI water |  |  |
|  | 33.33 g | Na pyrophosphate | 3.0 | 0.20 |
|  | 50.00 g | Na lauryl sulfate | 15.0 | 1.50 |
|  | 25.00 g | Lutensol AT 18 | 20.0 | 1.00 |
|  | 4.00 g | AM | 50.0 | 0.40 |
|  | 3.75 g | AA | 100.0 | 0.75 |
|  | 40.00 g | UMA (25% in MMA) | 100.0 | 8.00 |
|  | 140.00 g | S | 100.0 | 28.00 |
|  | 190.00 g | BA | 100.0 | 38.00 |
| Feed stream 2: | 39.00 g | DI water |  |  |
|  | 6.67 g | Na lauryl sulfate | 15.0 | 0.20 |
|  | 12.50 g | Lutensol AT 18 | 20.0 | 0.50 |
|  | 3.75 g | AA | 100.0 | 0.75 |
|  | 120.50 g | MMA | 100.0 | 24.10 |
| Feed stream 3: | 0.75 g | NaPS | 100.0 | 0.15 |
|  | 29.25 g | DI water |  |  |
| Feed stream 4: | 2.00 g | NH$_3$ | 25.0 | 0.10 |
| Feed stream 5: | 0.71 g | t-BHP | 70.0 | 0.10 |
|  | 4.29 g | DI water |  |  |
| Feed stream 6: | 0.45 g | Na$_2$S$_2$O$_5$ | 100.0 | 0.09 |
|  | 0.30 g | Acetone | 100.0 | 0.06 |
|  | 24.25 g | DI water |  |  |
| Feed stream 7: | 2.00 g | NH$_3$ | 25.0 | 0.10 |

Dispersion D5

The procedure followed was as for Dispersion D1. The resulting dispersion had the physical properties summarized in Table 1.

|  |  |  | Conc. [%] | Mono. [%] |
|---|---|---|---|---|
| Initial charge: | 210.00 g | DI water |  |  |
|  | 37.88 g | PS seed | 33.0 | 2.50 |
|  | 3.00 g | Feed stream 3 |  | 10.00 |
| Feed stream 1: | 84.00 g | DI water |  |  |
|  | 33.33 g | Na pyrophosphate | 3.0 | 0.20 |
|  | 50.00 g | Na lauryl sulfate | 15.0 | 1.50 |
|  | 25.00 g | Lutensol AT 18 | 20.0 | 1.00 |
|  | 4.00 g | AM | 50.0 | 0.40 |
|  | 3.75 g | AA | 100.0 | 0.75 |
|  | 40.00 g | UMA (25% in MMA) | 100.0 | 8.00 |
|  | 140.00 g | S | 100.0 | 28.00 |
|  | 190.00 g | BA | 100.0 | 38.00 |
| Feed stream 2: | 39.00 g | DI water |  |  |
|  | 6.67 g | Na lauryl sulfate | 15.0 | 0.20 |
|  | 12.50 g | Lutensol AT 18 | 20.0 | 0.50 |
|  | 3.75 g | AA | 100.0 | 0.75 |
|  | 120.50 g | S | 100.0 | 24.10 |
| Feed stream 3: | 0.75 g | NaPS | 100.0 | 0.15 |
|  | 29.25 g | DI water |  |  |
| Feed stream 4: | 2.00 g | NH$_3$ | 25.0 | 0.10 |
| Feed stream 5: | 0.71 g | t-BHP | 70.0 | 0.10 |
|  | 4.29 g | DI water |  |  |
| Feed stream 6: | 0.45 g | Na$_2$S$_2$O$_5$ | 100.0 | 0.09 |
|  | 0.30 g | Acetone | 100.0 | 0.06 |
|  | 24.25 g | DI water |  |  |
| Feed stream 7: | 2.00 g | NH$_3$ | 25.0 | 0.10 |

Dispersion D6

The procedure followed was the same as for Dispersion D1. The resulting dispersion had the physical properties summarized in Table 1.

|  |  |  | Conc. [%] | Mono. [%] |
|---|---|---|---|---|
| Initial charge: | 210.00 g | DI water |  |  |
|  | 22.73 g | PS seed | 33.0 | 1.50 |
|  | 2.00 g | Feed stream 3 |  | 10.00 |
| Feed stream 1: | 155.00 g | DI water |  |  |
|  | 33.33 g | Na lauryl sulfate | 15.0 | 1.00 |
|  | 3.75 g | AA | 100.0 | 0.75 |
|  | 145.00 g | S | 100.0 | 29.00 |
|  | 190.00 g | BA | 100.0 | 38.00 |
|  | 17.50 g | MMA | 100.0 | 3.50 |
|  | 19.50 g | UMA (25% in MMA) | 100.0 | 3.90 |
| Feed stream 2: | 52.00 g | DI water |  |  |
|  | 6.67 g | Na lauryl sulfate | 15.0 | 0.20 |
|  | 3.75 g | AA | 100.0 | 0.75 |
|  | 101.00 g | MMA | 100.0 | 20.20 |
|  | 19.50 g | UMA (25% in MMA) | 100.0 | 3.90 |
| Feed stream 3: | 1.00 g | $(NH_4)_2S_2O_8$ | 100.0 | 0.20 |
|  | 19.00 g | DI water |  |  |
| Feed stream 4: | 2.60 g | $NH_3$ | 25.0 | 0.13 |
| Feed stream 5: | 0.71 g | t-BHP | 70.0 | 0.10 |
|  | 4.29 g | DI water |  |  |
| Feed stream 6: | 0.45 g | $Na_2S_2O_5$ | 100.0 | 0.09 |
|  | 0.30 g | Acetone | 100.0 | 0.06 |
|  | 25.00 g | Lutensol AT 18 | 20.0 | 1.00 |
|  | 5.50 g | DI water |  |  |
| Feed stream 7: | 2.60 g | $NH_3$ | 25.0 | 0.13 |

Dispersion D7

The procedure followed was as for Dispersion D1. The resulting dispersion had the physical properties summarized in Table 1.

|  |  |  | Conc. [%] | Mono. [%] |
|---|---|---|---|---|
| Initial charge: | 210.00 g | DI water |  |  |
|  | 22.73 g | PS seed | 33.0 | 1.50 |
|  | 2.00 g | Feed stream 3 |  | 10.00 |
| Feed stream 1: | 161.00 g | DI water |  |  |
|  | 33.33 g | Na lauryl sulfate | 15.0 | 1.00 |
|  | 3.75 g | AA | 100.0 | 0.75 |
|  | 95.00 g | S | 100.0 | 19.00 |
|  | 190.00 g | BA | 100.0 | 38.00 |
|  | 67.50 g | MMA | 100.0 | 13.50 |
|  | 19.50 g | UMA (25% in MMA) | 100.0 | 3.90 |
| Feed stream 2: | 56.00 g | DI water |  |  |
|  | 6.67 g | Na lauryl sulfate | 15.0 | 0.20 |
|  | 3.75 g | AA | 100.0 | 0.75 |
|  | 19.50 g | UMA (25% in MMA) | 100.0 | 3.90 |
|  | 50.00 g | S | 100.0 | 10.00 |
|  | 50.50 g | MMA | 100.0 | 10.10 |
| Feed stream 3: | 1.00 g | $(NH_4)_2S_2O_8$ | 100.0 | 0.20 |
|  | 19.00 g | DI water |  |  |
| Feed stream 4: | 2.60 g | $NH_3$ | 25.0 | 0.13 |
| Feed stream 5: | 0.71 g | t-BHP | 70.0 | 0.10 |
|  | 4.29 g | DI water |  |  |
| Feed stream 6: | 0.45 g | $Na_2S_2O_5$ | 100.0 | 0.09 |
|  | 0.30 g | Acetone | 100.0 | 0.06 |
|  | 25.00 g | Lutensol AT 18 | 20.0 | 1.00 |
|  | 5.50 g | DI water |  |  |
| Feed stream 7: | 2.60 g | $NH_3$ | 25.0 | 0.13 |

Dispersion D8

The procedure followed was as for Dispersion D1. The resulting dispersion had the physical properties summarized in Table 1.

|  |  |  | Conc. [%] | Mono. [%] |
|---|---|---|---|---|
| Initial charge: | 200.00 g | DI water |  |  |
|  | 22.73 g | PS seed | 33.0 | 1.50 |
|  | 2.00 g | Feed stream 3 |  | 10.00 |
| Feed stream 1: | 149.00 g | DI water |  |  |
|  | 33.33 g | Na lauryl sulfate | 15.0 | 1.00 |
|  | 2.25 g | MAA | 100.0 | 0.45 |
|  | 1.50 g | AA | 100.0 | 0.30 |
|  | 145.00 g | S | 100.0 | 29.00 |
|  | 190.00 g | BA | 100.0 | 38.00 |
|  | 17.50 g | MMA | 100.0 | 3.50 |
|  | 19.50 g | UMA (25% in MMA) | 100.0 | 3.90 |
| Feed stream 2: | 50.00 g | DI water |  |  |
|  | 6.67 g | Na lauryl sulfate | 15.0 | 0.20 |
|  | 2.25 g | MAA | 100.0 | 0.45 |
|  | 1.50 g | AA | 100.0 | 0.30 |
|  | 101.00 g | MMA | 100.0 | 20.20 |
|  | 19.50 g | UMA (25% in MMA) | 100.0 | 3.90 |
| Feed stream 3: | 1.00 g | $(NH_4)_2S_2O_8$ | 100.0 | 0.20 |
|  | 19.00 g | DI water |  |  |
| Feed stream 4: | 2.20 g | $NH_3$ | 25.0 | 0.11 |
| Feed stream 5: | 0.71 g | t-BHP | 70.0 | 0.10 |
|  | 4.29 g | DI water |  |  |
| Feed stream 6: | 0.45 g | $Na_2S_2O_5$ | 100.0 | 0.09 |
|  | 0.30 g | Acetone | 100.0 | 0.06 |
|  | 25.00 g | Lutensol AT 18 | 20.0 | 1.00 |
|  | 24.25 g | DI water |  |  |
| Feed stream 7: | 2.20 g | $NH_3$ | 25.0 | 0.11 |

Dispersion D9

The procedure followed was as for Dispersion D1. The resulting dispersion had the physical properties summarized in Table 1.

|  |  |  | Conc. [%] | Mono. [%] |
|---|---|---|---|---|
| Initial charge: | 200.00 g | DI water |  |  |
|  | 22.73 g | PS seed | 33.0 | 1.50 |
|  | 2.00 g | Feed stream 3 |  | 10.00 |
| Feed stream 1: | 149.00 g | DI water |  |  |
|  | 33.33 g | Na lauryl sulfate | 15.0 | 1.00 |
|  | 2.25 g | MAA | 100.0 | 0.45 |
|  | 1.50 g | AA | 100.0 | 0.30 |
|  | 95.00 g | S | 100.0 | 19.00 |
|  | 190.00 g | BA | 100.0 | 38.00 |
|  | 67.50 g | MMA | 100.0 | 13.50 |
|  | 19.50 g | UMA (25% in MMA) | 100.0 | 3.90 |

|  |  |  | Conc. [%] | Mono. [%] |
|---|---|---|---|---|
| Feed stream 2: | 50.00 g | DI water |  |  |
|  | 6.67 g | Na lauryl sulfate | 15.0 | 0.20 |
|  | 2.25 g | MAA | 100.0 | 0.45 |
|  | 1.50 g | AA | 100.0 | 0.30 |
|  | 50.00 g | S | 100.0 | 10.00 |
|  | 51.00 g | MMA | 100.0 | 10.20 |
|  | 19.50 g | UMA (25% in MMA) | 100.0 | 3.90 |
| Feed stream 3: | 1.00 g | $(NH_4)_2S_2O_8$ | 100.0 | 0.20 |
|  | 19.00 g | DI water |  |  |
| Feed stream 4: | 2.00 g | $NH_3$ | 25.0 | 0.10 |
| Feed stream 5: | 0.71 g | t-BHP | 70.0 | 0.10 |
|  | 4.29 g | DI water |  |  |
| Feed stream 6: | 0.45 g | $Na_2S_2O_5$ | 100.0 | 0.09 |
|  | 0.30 g | Acetone | 100.0 | 0.06 |
|  | 25.00 g | Lutensol AT 18 | 20.0 | 1.00 |
|  | 24.25 g | DI water |  |  |
| Feed stream 7: | 2.00 g | $NH_3$ | 25.0 | 0.10 |

Dispersion D10

The procedure followed was as for Dispersion D1. The resulting dispersion had the physical properties summarized in Table 1.

|  |  |  | Conc. [%] | Mono. [%] |
|---|---|---|---|---|
| Initial charge: | 200.00 g | DI water |  |  |
|  | 37.88 g | PS seed | 33.0 | 2.50 |
|  | 2.00 g | Feed stream 3 |  | 10.00 |
| Feed stream 1: | 143.00 g | DI water |  |  |
|  | 50.00 g | Na lauryl sulfate | 15.0 | 1.50 |
|  | 4.00 g | AM | 50.0 | 0.40 |
|  | 3.75 g | AA | 100.0 | 0.75 |
|  | 190.00 g | BA | 100.0 | 38.00 |
|  | 160.50 g | MMA | 100.0 | 32.10 |
|  | 19.50 g | UMA (25% in MMA) | 100.0 | 3.90 |
| Feed stream 2: | 55.00 g | DI water |  |  |
|  | 6.67 g | Na lauryl sulfate | 15.0 | 0.20 |
|  | 3.75 g | AA | 100.0 | 0.75 |
|  | 50.00 g | BMA | 100.0 | 10.00 |
|  | 51.00 g | MMA | 100.0 | 10.20 |
|  | 19.50 g | UMA (25% in MMA) | 100.0 | 3.90 |
| Feed stream 3: | 1.00 g | $(NH_4)_2S_2O_8$ | 100.0 | 0.20 |
|  | 19.00 g | DI water |  |  |
| Feed stream 4: | 2.60 g | $NH_3$ | 25.0 | 0.13 |
| Feed stream 5: | 0.71 g | t-BHP | 70.0 | 0.10 |
|  | 4.29 g | DI water |  |  |
| Feed stream 6: | 0.45 g | $Na_2S_2O_5$ | 100.0 | 0.09 |
|  | 0.30 g | Acetone | 100.0 | 0.06 |
|  | 25.00 g | Lutensol AT 18 | 20.0 | 1.00 |
|  | 5.50 g | DI water |  |  |
| Feed stream 7: | 2.60 g | $NH_3$ | 25.0 | 0.13 |

Dispersion D11

The procedure followed was as for Dispersion D1. The resulting dispersion had the physical properties summarized in Table 1.

|  |  |  | Conc. [%] | Mono. [%] |
|---|---|---|---|---|
| Initial charge: | 200.00 g | DI water |  |  |
|  | 37.88 g | PS seed | 33.0 | 2.50 |
|  | 4.00 g | Feed stream 3 |  | 10.00 |
| Feed stream 1: | 118.00 g | DI water |  |  |
|  | 50.00 g | Na lauryl sulfate | 15.0 | 1.50 |
|  | 4.00 g | AM | 50.0 | 0.40 |
|  | 3.75 g | AA | 100.0 | 0.75 |
|  | 20.00 g | UMA (25% in MMA) | 100.0 | 4.00 |
|  | 145.00 g | S | 100.0 | 29.00 |
|  | 190.00 g | BA | 100.0 | 38.00 |
|  | 15.00 g | MMA | 100.00 | 3.00 |
| Feed stream 2: | 45.00 g | DI water |  |  |
|  | 6.67 g | Na lauryl sulfate | 15.0 | 0.20 |
|  | 3.75 g | AA | 100.0 | 0.75 |
|  | 20.00 g | UMA | 100.0 | 4.00 |
|  | 100.50 g | MMA | 100.0 | 20.10 |
| Feed stream 3: | 1.00 g | $(NH_4)_2S_2O_8$ | 100.0 | 0.20 |
|  | 39.00 g | DI water |  |  |
| Feed stream 4: | 2.20 g | $NH_3$ | 25.0 | 0.11 |
| Feed stream 5: | 0.71 g | t-BHP | 70.0 | 0.10 |
|  | 4.29 g | DI water |  |  |
| Feed stream 6: | 0.45 g | $Na_2S_2O_5$ | 100.0 | 0.09 |
|  | 0.30 g | Acetone | 100.0 | 0.06 |
|  | 25.00 g | Lutensol AT 18 | 20.0 | 1.00 |
|  | 24.25 g | DI water |  |  |
| Feed stream 7: | 2.20 g | $NH_3$ | 25.0 | 0.11 |

Dispersion D12

The procedure followed was as for Dispersion D1. The resulting dispersion had the physical properties summarized in Table 1.

|  |  |  | Conc. [%] | Mono. [%] |
|---|---|---|---|---|
| Initial charge: | 200.00 g | DI water |  |  |
|  | 37.88 g | PS seed | 33.0 | 2.50 |
|  | 4.00 g | Feed stream 3 |  | 10.00 |
| Feed stream 1: | 118.00 g | DI water |  |  |
|  | 50.00 g | Na lauryl sulfate | 15.0 | 1.50 |
|  | 4.00 g | AM | 50.0 | 0.40 |
|  | 3.75 g | MAA | 100.0 | 0.75 |
|  | 20.00 g | UMA (25% in MMA) | 100.0 | 4.00 |
|  | 125.00 g | S | 100.0 | 25.00 |
|  | 190.00 g | BA | 100.0 | 38.00 |
|  | 35.00 g | MMA | 100.0 | 7.00 |
| Feed stream 2: | 45.00 g | DI water |  |  |
|  | 6.67 g | Na lauryl sulfate | 15.0 | 0.20 |
|  | 3.75 g | AA | 100.0 | 0.75 |
|  | 20.00 g | UMA | 100.0 | 4.00 |
|  | 75.50 g | MMA | 100.0 | 15.10 |
|  | 25.00 g | S | 100.0 | 5.00 |
| Feed stream 3: | 1.00 g | $(NH_4)_2S_2O_8$ | 100.0 | 0.20 |
|  | 39.00 g | DI water |  |  |
| Feed stream 4: | 1.80 g | $NH_3$ | 25.0 | 0.09 |
| Feed stream 5: | 0.71 g | t-BHP | 70.0 | 0.10 |
|  | 4.29 g | DI water |  |  |
| Feed stream 6: | 0.45 g | $Na_2S_2O_5$ | 100.0 | 0.09 |
|  | 0.30 g | Acetone | 100.0 | 0.06 |
|  | 25.00 g | Lutensol AT 18 | 20.0 | 1.00 |
|  | 24.25 g | DI water |  |  |
| Feed stream 7: | 1.80 g | $NH_3$ | 25.0 | 0.09 |

Dispersion DV1

The procedure followed was as for Dispersion D1. The resulting dispersion had the physical properties summarized in Table 1.

|  |  |  | Conc. [%] | Mono. [%] |
|---|---|---|---|---|
| Initial charge: | 210.00 g | DI water |  |  |
|  | 37.88 g | PS seed | 33.0 | 2.50 |
|  | 4.00 g | Feed stream 3 |  | 10.00 |
| Feed stream 1: | 68.00 g | DI water |  |  |
|  | 33.33 g | Na pyrophosphate | 3.0 | 0.20 |
|  | 66.67 g | Na lauryl sulfate | 15.0 | 2.00 |
|  | 31.25 g | Lutensol AT 18 | 20.0 | 1.25 |
|  | 4.00 g | AM | 50.0 | 0.40 |
|  | 3.75 g | AA | 100.0 | 0.75 |
|  | 40.00 g | UMA (25% in MMA) | 100.0 | 8.00 |
|  | 140.00 g | MMA | 100.0 | 28.00 |
|  | 190.00 g | BA | 100.0 | 38.00 |
| Feed stream 2: | 36.00 g | DI water |  |  |
|  | 6.67 g | Na lauryl sulfate | 15.0 | 0.20 |
|  | 18.75 g | Lutensol AT 18 | 20.0 | 0.75 |
|  | 3.75 g | AA | 100.0 | 0.75 |
|  | 120.50 g | MMA | 100.0 | 24.10 |
| Feed stream 3: | 0.75 g | NaPS | 100.0 | 0.15 |
|  | 29.25 g | DI water |  |  |
| Feed stream 4: | 2.20 g | $NH_3$ | 25.0 | 0.11 |
| Feed stream 5: | 0.71 g | t-BHP | 70.0 | 0.10 |
|  | 4.29 g | DI water |  |  |
| Feed stream 6: | 0.45 g | $Na_2S_2O_5$ | 100.0 | 0.09 |
|  | 0.30 g | Acetone | 100.0 | 0.06 |
|  | 24.25 g | DI water |  |  |
| Feed stream 7: | 2.20 g | $NH_3$ | 25.0 | 0.11 |

Dispersion DV2

The procedure followed was as for Dispersion D1. The resulting dispersion had the physical properties summarized in Table 1.

|  |  |  | Conc. [%] | Mono. [%] |
|---|---|---|---|---|
| Initial charge: | 200.00 g | DI water |  |  |
|  | 37.88 g | PS seed | 33.0 | 2.50 |
|  | 2.00 g | Feed stream 3 |  | 10.00 |
| Feed stream 1: | 143.00 g | DI water |  |  |
|  | 50.00 g | Na lauryl sulfate | 15.0 | 1.50 |
|  | 4.00 g | AM | 50.0 | 0.40 |
|  | 3.75 g | AA | 100.0 | 0.75 |
|  | 190.00 g | BA | 100.0 | 38.00 |
|  | 160.50 g | MMA | 100.0 | 32.10 |
|  | 19.50 g | UMA (25% in MMA) | 100.0 | 3.90 |
| Feed stream 2: | 55.00 g | DI water |  |  |
|  | 6.67 g | Na laurylsulfate | 15.0 | 0.20 |
|  | 3.75 g | AA | 100.0 | 0.75 |
|  | 101.00 g | MMA | 100.0 | 20.20 |
|  | 19.50 g | UMA (25% in MMA) | 100.0 | 3.90 |
| Feed stream 3: | 1.00 g | $(NH_4)_2S_2O_8$ | 100.0 | 0.20 |
|  | 19.00 g | DI water |  |  |
| Feed stream 4: | 2.60 g | $NH_3$ | 25.0 | 0.13 |
| Feed stream 5: | 0.71 g | t-BHP | 70.0 | 0.10 |
|  | 4.29 g | DI water |  |  |
| Feed stream 6: | 0.45 g | $Na_2S_2O_5$ | 100.0 | 0.09 |
|  | 0.30 g | Acetone | 100.0 | 0.06 |
|  | 25.00 g | Lutensol AT 18 | 20.0 | 1.00 |
|  | 5.50 g | DI water |  |  |
| Feed stream 7: | 2.60 g | $NH_3$ | 25.0 | 0.13 |

Table 1 below reports the solids content, pH, minimum film-forming temperature (MFT) and particle size, and the light transmittance.

TABLE 1

| Dispersion | Solids content [%] | pH | MFT [° C.] | Particle size [nm] [a] | LT [b] |
|---|---|---|---|---|---|
| D1 | 48.9 | 6.7 | 26 | 115 | 86 |
| D2 | 49.1 | 6.3 | 28 | 116 | 83 |
| D3 | 48.6 | 7.6 | 28 | 112 | 85 |
| D4 | 48.6 | 7.5 | 23 | 114 | 84 |
| D5 | 49.0 | 6.5 | 36 | 115 | 80 |
| D6 | 50.1 | 8.2 | 34 | 127 | 80 |
| D7 | 49.0 | 7.9 | 30 | 124 | 82 |
| D8 | 49.6 | 9.2 | 39 | 127 | 79 |
| D9 | 49.8 | 7.7 | 30 | 123 | 81 |
| D10 | 49.2 | 8.1 | 20 | 116 | 90 |
| D11 | 49.4 | 7.5 | 29 | 136 | 81 |
| D12 | 48.9 | 7.7 | 24 | 113 | 83 |
| DV1 | 48.8 | 8.1 | 24 | 110 | 90 |
| DV2 | 49.2 | 8.3 | 30 | 116 | 89 |

[a] determined by means of quasielastic light scattering
[b] light transmittance in %

The emulsion polymers prepared were formulated as high gloss paints. For this purpose, a color paste was produced by intensive mixing of the following ingredients.

TABLE 2

|  | Parts by weight |
|---|---|
| Water | 10 |
| Propylene glycol | 20 |
| Pigmentvert. MD 20 (sodium salt of a maleic acid-diisobutylene copolymer, 25%) | 1.5 |
| Patco 519 (mixture of amorphous silica and isoparaffin (defoamer)) | 2 |
| Collacral PU 85 (solution of a diurethane in water/butyl diglycol (4:1), diluted (PU thickener), 25%) | 10 |
| Proxel GXL (aqueous dipropylene glycol solution of about 20% 1,2-benzisothiazolin-3-one (preservative)) | 2 |
| Tiona RCS 535 (titanium dioxide, rutile) | 260.2 |
| Patco 519 | 2 |
| Dowanol PnB (3-butoxypropan-2-ole (film-forming auxiliary)) | 30 |
| Texanol (2,2,4-trimethyl-1-3-pentanediol monoisobutyrate (film-forming auxiliary)) | 30 |
| Total | 367.7 |

The high gloss paint was formulated subsequently by adding 302.6 parts by weight of dispersion of the emulsion polymer and 13.5 parts by weight of water to 183.9 parts by weight of color paste: the paint had a pigment volume concentration of 18%.

The results of the wet abrasion resistance test, of the gloss measurement and of the viscosity measurement are summarized below.

| Dispersion | Gloss 20° [%] | Gloss 60° [%] | Gloss haze [%] | Viscosity Stormer [KU] | Abrasion resistance [cycles] |
|---|---|---|---|---|---|
| D1 | 62 | 84 | 66 | 68 | 1300 |
| D2 | 52 | 77 | 64 | 99 | 2200 |
| D3 | 46 | 74 | 88 | 101 | 3000 |
| D4 | 65 | 87 | 72 | 68 | 1300 |
| D5 | 50 | 75 | 85 | 112 | 3400 |
| D6 | 75 | 91 | 56 | 90 | 2250 |
| D7 | 73 | 91 | 63 | 106 | >3100 |
| D8 | 63 | 87 | 88 | 83 | 3100 |

-continued

| Dispersion | Gloss 20° [%] | Gloss 60° [%] | Gloss haze [%] | Viscosity Stormer [KU] | Abrasion resistance [cycles] |
|---|---|---|---|---|---|
| D9 | 63 | 88 | 96 | 125 | >3100 |
| D10 | 55 | 81 | 80 | 83 | 3200 |
| D11 | 73 | 91 | 68 | 88 | 1600 |
| D12 | 58 | 85 | 76 | 93 | 2600 |
| DV1 | 46 | 75 | 122 | 58 | 725 |
| DV2 | 37 | 73 | 110 | 63 | 1400 |

It is found that the coating compositions comprising the emulsion polymers of the invention exhibit significantly lower gloss haze and higher abrasion resistance than the comparative dispersions. The coating compositions of the invention exhibit satisfactory blocking resistance.

We claim:

1. A multistage emulsion polymer comprising at least one first domain having a glass transition temperature $T_g$ of from −10 to +40° C. and at least one second domain having a $T_g$ of from +50 to 120° C., wherein the weight ratio of the first domain to the second domain is in the range from 90:10 to 50:50, the first domain contains copolymerized units of
   1a) from 5 to 60% by weight of methyl methacrylate and/or ethyl methacrylate,
   1b) from 20 to 80% by weight of $C_4$–$C_{12}$ alkyl acrylate,
   1c) up to 50% by weight of vinylaromatic compounds,
   1d) from 0.1 to 5% by weight of ethylenically unsaturated carboxylic acids,
   1e) up to 5% by weight of ethylenically unsaturated carboxamides,
   1f) up to 10% by weight of other ethylenically unsaturated monomers,
and the second domain contains copolymerized units of
   2a) up to 99.9% by weight of methyl methacrylate and/or ethyl methacrylate,
   2b) up to 99.9% by weight of vinylaromatic compounds and/or $C_4$ to $C_{12}$ alkyl methacrylates,
   2c) from 0.1 to 5% by weight of ethylenically unsaturated carboxylic acids,
   2d) up to 10% by weight of ethylenically unsaturated carboxamides,
   2e) up to 10% by weight of other ethylenically unsaturated monomers,
wherein the first and/or the second domain contains from 0.1 to 10% by weight of a nitrogen-containing adhesion monomer and the first domain contains at least 10% by weight of viniylaromatic compounds, all of the weights based on the respective domain.

2. An emulsion polymer as claimed in claim 1, wherein the weight ratio of the first domain to the second domain is in the range from 80:20 to 60:40.

3. An emulsion polymer as claimed in claim 1, wherein the nitrogen-containing adhesion monomer is ureidoethyl methacrylate.

4. An emulsion polymer as claimed in claim 1, wherein the $C_4$–$C_{12}$ alkyl methacrylate is selected from the group consisting of n-butyl methacrylate, isobutyl methacrylate, t-butyl methacrylate and mixtures thereof.

5. An emulsion polymer as claimed in claim 1, wherein the vinylaromatic compound is styrene.

6. An emulsion polymer as claimed in claim 1, wherein the $C_4$–$C_{12}$ alkyl acrylate is selected from the group consisting of n-butyl acrylate, 2-ethylhexyl acrylate and mixtures thereof.

7. An emulsion polymer as claimed in claim 1, which is prepared in the presence of a polystyrene seed latex.

8. A water-based coating composition comprising an emulsion polymer as claimed in claim 1 and at least one pigment.

9. A coating composition as claimed in claim 8, further comprising an associative thickener.

10. A coating composition as claimed in claim 8, which has a pigment volume concentration of from 10 to 30.

11. The multistage emulsion polymer claimed in claim 1, wherein the Tg of the second domain is from 105 to 120° C.

12. The emulsion polymer of claim 1, wherein the first domain consists of copolymerized units of
   1a) from 5 to 50% by weight of methyl methacrylate and/or ethyl methacrylate,
   1b) from 30 to 60% by weight of $C_4$–$C_{12}$ alkyl acrylate,
   1c) from 15 to 50% by weight of vinylaromatic compounds,
   1d) from 0.1 to 5% by weight of ethylenically unsaturated carboxylic acids,
   1e) up to 5% by weight of ethylenically unsaturated carboxamides,
   1f) up to 10% by weight of other ethylenically unsaturated monomers,
and the second domain consists of copolymerized units of
   2a) from 45 to 99% by weight of methyl methacrylate and/or ethyl methacrylate,
   2b) from 1.0 to 50% by weight of vinylaromatic compounds and/or $C_4$ to $C_{12}$ alkyl methacrylates,
   2c) from 0.1 to 5% by weight of ethylenically unsaturated carboxylic acids,
   2d) up to 10% by weight of ethylenically unsaturated carboxamides,
   2e) up to 10% by weight of other ethylenically unsaturated monomers.

13. The emulsion polymer of claim 1, wherein the first domain consists of copolymerized units of
   1a) from 5 to 30% by weight of methyl methacrylate and/or ethyl methacrylate,
   1b) from 30 to 60% by weight of $C_4$–$C_{12}$ alkyl acrylate,
   1d) from 0.1 to 5% by weight of ethylenically unsaturated carboxylic acids,
   1e) up to 5% by weight of ethylenically unsaturated carboxamides,
   1f) up to 10% by weight of other ethylenically unsaturated monomers,
and the second domain consists of copolymerized units of
   2a) up to 84.9% by weight of methyl methacrylate and/or ethyl methacrylate,
   2b) from 15 to 99% by weight of vinylaromatic compounds and/or $C_4$ to $C_{12}$ alkyl melhacrylates,
   2c) from 0.1 to 5% by weight of ethylenically unsaturated carboxylic acids,
   2d) up to 10% by weight of ethylenically unsaturated carboxamides,
   2e) up to 10% by weight of other ethylenically unsaturated monomers.

14. A multistage emulsion polymer comprising at least one first domain having a glass transition temperature $T_g$ of from −10 to +40° C. and at least one second domain having a $T_g$ of from +50 to 120° C., wherein the weight ratio of the first domain to the second domain is in the range from 90:10 to 50:50, the first domain contains copolymerized units of 1a) from 5 to 60% by weight of methyl methacrylate and/or ethyl methacrylate, 1b) from 20 to 80% by weight of $C_4$–$C_{12}$ alkyl acrylate, 1c) up to 50% by weight of vinylaromatic compounds, 1d) from 0.1 to 5% by weight of ethylenically unsaturated carboxylic acids, 1e) up to 5% by weight of ethylenically unsaturated carboxamides, 1f) up to 10% by weight of other ethylenically unsaturated monomers, and the second domain contains copolymerized units of 2a) up to 99.9% by weight of methyl methacrylate and/or ethyl methacrylate, 2b) up to 99.9% by weight of vinylaromatic compounds and/or $C_4$ to $C_{12}$ alkyl methacrylates, 2c) from 0.1 to 5% by weight of ethylenically unsaturated carboxylic acids, 2d) up to 10% by weight of ethylenically unsaturated carboxamides, 2e) up to 10% by weight of other ethylenically unsaturated monomers, wherein the first and/or second domain contains from 0.1 to 10% by weight of a nitrogen-containing adhesion monomer and the second domain contains at least 15% by weight of vinylaromatic compounds, all of the weights based on the respective domain.

15. The emulsion polymer as claimed in claim 14, wherein the weight ratio of the first domain to the second domain is in the range from 80:20 to 60:40.

16. The emulsion polymer of claim 14, wherein the first domain consists of copolymerized units of 1a) from 5 to 50% by weight of methyl methacrylate and/or ethyl methacrylate, 1b) from 30 to 60% by weight of $C_4$–$C_{12}$ alkyl acrylate, 1c) from 15 to 50% by weight of vinylaromatic compounds, 1d) from 0.1 to 5% by weight of ethylenically unsaturated carboxylic acids, 1e) up to 5% by weight of ethylenically unsaturated carboxamides, 1f) up to 10% by weight of other ethylenically unsaturated monomers, and the second domain consists of copolymerized units of 2a) from 45 to 99% by weight of methyl methacrylate and/or ethyl methacrylate, 2b) from 1.0 to 50% by weight of vinylaromatic compounds and/or $C_4$ to $C_{12}$ alkyl methacrylates, 2c) from 0.1 to 5% by weight of ethylenically unsaturated carboxylic acids, 2d) up to 10% by weight of ethylenically unsaturated carboxamides, 2e) up to 10% by weight of other ethylenically unsaturated monomers.

17. The emulsion polymer of claim 14, wherein the first domain consists of copolymerized units of 1a) from 5 to 30% by weight of methyl methacrylate and/or ethyl methacrylate, 1b) from 30 to 60% by weight of $C_4$–$C_{12}$ alkyl acrylate, 1d) from 0.1 to 5% by weight of ethylenically unsaturated carboxylic acids, 1e) up to 5% by weight of ethylenically unsaturated carboxamides, 1f) up to 10% by weight of other ethylenically unsaturated monomers, and the second domain consists of copolymerized units of 2a) up to 84.9% by weight of methyl methacrylate and/or ethyl methacrylate, 2b) from 15 to 99% by weight of vinylaromatic compounds and/or $C_4$ to $C_{12}$ alkyl methacrylates, 2c) from 0.1 to 5% by weight of ethylenically unsaturated carboxylic acids, 2d) up to 10% by weight of ethylenically unsaturated carboxamides, 2e) up to 10% by weight of other ethylenically unsaturated monomers.

18. The emulsion polymer as claimed in claim 14, wherein the $C_4$–$C_{12}$ alkyl acrylate is selected from the group consisting of n-butyl acrylate, 2-ethylhexyl acrylate and mixtures thereof.

19. The emulsion polymer as claimed in claim 14, which is prepared in the presence of a polystyrene seed latex.

20. A water-based coating composition comprising an emulsion polymer as claimed in claim 14 and at least one pigment.

21. The coating composition as claimed in claim 20, further comprising an associative thickener.

22. The coating composition as claimed in claim 20, which has a pigment volume concentration of from 10 to 30.

23. The emulsion polymer as claimed in claim 14, wherein the second domain has a $T_g$ of from 105 to 120° C.

24. A multistage emulsion polymer comprising at least one first domain having a glass transition temperature $T_g$ of from −10 to +40° C. and at least one second domain having a $T_g$ of from +50 to 120° C., wherein the weight ratio of the first domain to the second domain is in the range from 90:10 to 50:50, the first domain contains copolymerized units of 1a) from 5 to 60% by weight of methyl methacrylate and/or ethyl methacrylate, 1b) from 20 to 80% by weight of $C_4$–$C_{12}$ alkyl acrylate, 1c) up to 50% by weight of vinylaromatic compounds, 1d) from 0.1 to 5% by weight of ethylenically unsaturated carboxylic acids, 1e) up to 5% by weight of ethylenically unsaturated carboxamides, 1f) up to 10% by weight of other ethylenically unsaturated monomers, and the second domain contains copolymerized units of 2a) up to 99.9% by weight of methyl methacrylate and/or ethyl methacrylate, 2b) up to 99.9% by weight of vinylaromatic compounds and/or $C_4$ to $C_{12}$ alkyl methacrylates, 2c) from 0.1 to 5% by-weight of ethylenically unsaturated carboxylic acids, 2d) up to 10% by weight of ethylenically unsaturated carboxamides, 2e) up to 10% by weight of other ethylenically unsaturated monomers, wherein the first and/or the second domain contains from 0.1 to 10% by weight of a nitrogen-containing adhesion monomer and the second domain contains at least 15% by weight of $C_4$–$C_{12}$ alkyl methacrylates, all of the weights based on the respective domain.

25. The emulsion polymer as claimed in claim 24, wherein the weight ratio of the first domain to the second domain is in the range from 80:20 to 60:40.

26. The emulsion polymer of claim 24, wherein the first domain consists of copolymerized units of 1a) from 5 to 50% by weight of methyl methacrylate and/or ethyl methacrylate, 1b) from 30 to 60% by weight of $C_4$–$C_{12}$ alkyl acrylate, 1c) from 15 to 50% by weight of vinylaromatic compounds, 1d) from 0.1 to 5% by weight of ethylenically unsaturated carboxylic acids, 1e) up to 5% by weight of ethylenically unsaturated carboxamides, 1f) up to 10% by weight of other ethylenically unsaturated monomers, and the second domain consists of copolymerized units of 2a) from 45 to 99% by weight of methyl methacrylate and/or ethyl methacrylate, 2b) from 1.0 to 50% by weight of vinylaromatic compounds and/or $C_4$ to $C_{12}$ alkyl methacrylates, 2c) from 0.1 to 5% by weight of ethylenically unsaturated carboxylic acids, 2d) up to 10% by weight of ethylenically unsaturated carboxamides, 2e) up to 10% by weight of other ethylenically (unsaturated monomers.

27. The emulsion polymer of claim 24, herein the first domain consists of copolymerized units of 1a) from 5 to 30% by weight of methyl methacrylate and/or ethyl methacrylate, 1b) from 30 to 60% by weight of $C_4$–$C_{12}$ alkyl acrylate, 1d) from 0.1 to 5% by weight of ethylenically unsaturated carboxylic acids, 1e) up to 5% by weight of ethylenically unsaturated carboxamides, 1f) up to 10% by weight of other ethylenically unsaturated monomers, and the second domain consists of copolymerized units of 2a) up to 84.9% by weight of methyl methacrylate and/or ethyl methacrylate, 2b) from 15 to 99% by weight of vinylaromatic compounds and/or $C_4$ to $C_{12}$ alkyl methacrylates, 2c) from 0.1 to 5% by weight of ethylenically unsaturated carboxylic acids, 2d) up to 10% by weight of ethylenically unsaturated carboxamides, 2e) up to 10% by weight of other ethylenically unsaturated monomers.

28. The emulsion polymer as claimed in claim 24, wherein the $C_4$–$C_{12}$ alkyl acrylate is selected from the group consisting of n-butyl acrylate, 2-ethylhexyl acrylate and mixtures thereof.

29. The emulsion polymer as claimed in claim 24, which is prepared in the presence of a polystyrene seed latex.

30. A water-based coating composition comprising an emulsion polymer as claimed in claim 24 and at least one pigment.

31. The coating composition as claimed in claim 30, further comprising an associative thickener.

32. The coating composition as claimed in claim 30, which has a pigment volume concentration of from 10 to 30.

33. The emulsion polymer as claimed in claim 24, wherein the second domain has a $T_g$ of from 105 to 120° C.

* * * * *